United States Patent [19]
Weber

[11] Patent Number: 5,991,977
[45] Date of Patent: Nov. 30, 1999

[54] DRAWING UNIT FOR A FIBER PROCESSING MACHINE PARTICULARLY A REGULATED DRAWING FRAME FOR PROCESSING COTTON

[75] Inventor: Wilfried Weber, Mönchengladbach, Germany

[73] Assignee: Trützschler GmbH & Co. KG, Mönchenengladbach, Germany

[21] Appl. No.: 08/957,330

[22] Filed: Oct. 24, 1997

[30] Foreign Application Priority Data

Oct. 26, 1996 [DE] Germany ............... 196 44 560

[51] Int. Cl.$^6$ ............................................. D01H 5/00
[52] U.S. Cl. .................... 19/236; 19/0.2; 19/0.22; 19/258
[58] Field of Search ............... 19/236, 258, 260, 19/293, 0.2, 0.21, 0.22; 66/207

[56] References Cited

U.S. PATENT DOCUMENTS

| | | | |
|---|---|---|---|
| 4,266,324 | 5/1981 | Hasegawa et al. | 19/236 |
| 4,561,152 | 12/1985 | Niimi et al. | 19/293 |
| 4,646,391 | 3/1987 | Wolf | 19/293 |
| 5,161,284 | 11/1992 | Leifeld | 19/236 |
| 5,295,372 | 3/1994 | Kemper et al. | 66/207 |
| 5,307,648 | 5/1994 | Forkert et al. | 66/207 |
| 5,311,751 | 5/1994 | Winter et al. | 66/207 |
| 5,311,752 | 5/1994 | Gille | 66/207 |
| 5,438,733 | 8/1995 | Melcher et al. | 19/293 |
| 5,473,913 | 12/1995 | Bogucki-Land | 66/207 |
| 5,803,682 | 9/1998 | Henzler et al. | 409/138 |

FOREIGN PATENT DOCUMENTS

| | | |
|---|---|---|
| 41 40 984 | 6/1993 | Germany . |
| 42 32 302 | 3/1994 | Germany . |
| 43 32 249 | 3/1995 | Germany . |

OTHER PUBLICATIONS

Körber et al, "Ein Regler für drei Systeme [A Regulator for Three System"], elektro Automation 48, No. 9, Sep. 1995 issue, pp. 60, 61.

Homburg et al, "Freie Geberwahl bei Antriebsregelungen" ["Free Transmitter Selection in Drive Regulations"], Steuern und Regeln issue of Dec. 1995, pp. 1755, 1756.

*Primary Examiner*—Michael A. Neas
*Assistant Examiner*—Gary L. Welch
*Attorney, Agent, or Firm*—Venable; Gabor J. Kelemen

[57] ABSTRACT

A drawing unit for drawing sliver includes first and second drawing roll pairs being spaced from one another in the direction of sliver advance. One drawing roll in each drawing roll pair is a driven roll. There are further provided first and second drive motors; a first torque-transmitting device connected to the first drive motor and to the driven roll of the first drawing roll pair for driving the first drawing roll pair in a forward sense for feeding the sliver; a second torque-transmitting device connected to the second drive motor and to the driven roll of the second drawing roll pair for driving the second drawing roll pair in a forward sense for feeding the sliver; an electronic control and regulating device connected to the first and second drive motors; a freewheel backstop operatively connected to the driven roll of the first roll pair for preventing rotation thereof in a reverse sense; and an incremental rotary path indicator coupled to the driven roll of the second roll pair for generating signals representing rotary data of the driven roll of the second roll pair.

18 Claims, 5 Drawing Sheets

DRAWING UNIT FOR A FIBER PROCESSING MACHINE PARTICULARLY A REGULATED DRAWING FRAME FOR PROCESSING COTTON

CROSS REFERENCE TO RELATED APPLICATION

This application claims the priority of German Application No. 196 44 560.4 filed Oct. 26, 1996, which is incorporated herein by reference.

BACKGROUND OF THE INVENTION

This invention relates to a drawing unit for a fiber processing machine, particularly a regulated drawing frame for processing cotton and is of the type which has at least two consecutive roll pairs, each having at least one roll driven by its own electric motor and further includes an electronic control and regulating device connected to the electric motors.

In a known drawing frame of the above-outlined type, disclosed, for example, in U.S. Pat. No. 5,438,733, with each driven roll a freewheel backstop is associated for preventing a reverse rotation of the roll. Such an arrangement has been found to be operationally generally satisfactory. It may occur, however, that the electric motors—even if to a small extent—turn in the reverse direction in a non-uniform manner. In case the electric motor associated with the preliminary drawing zone turns to a greater extent in the reverse direction, than the electric motor associated with the principal drawing zone, a faulty draft in the sliver may occur.

SUMMARY OF THE INVENTION

It is an object of the invention to provide an improved drawing unit of the above-outlined type from which the discussed disadvantage is eliminated and which, in particular, further improves the drawing of the sliver.

This object and others to become apparent as the specification progresses, are accomplished by the invention, according to which, briefly stated, the drawing unit for drawing sliver includes first and second drawing roll pairs being spaced from one another in the direction of sliver advance. One drawing roll in each drawing roll pair is a driven roll. There are further provided first and second electric drive motors; a first torque-transmitting device connected to the first drive motor and to the driven roll of the first drawing roll pair for driving the first drawing roll pair in a forward sense for feeding the sliver; a second torque-transmitting device connected to the second drive motor and to the driven roll of the second drawing roll pair for driving the second drawing roll pair in a forward sense for feeding the sliver; an electronic control and regulating device connected to the first and second drive motors; a freewheel backstop operatively connected to the driven roll of the first roll pair for preventing rotation thereof in a reverse sense; and an incremental rotary path indicator coupled to the driven roll of the second roll pair for generating signals representing rotary data of the driven roll of the second roll pair.

By providing a freewheel backstop at the inlet of the drawing unit and an incremental path indicator at the outlet thereof, the reverse rotations of the electric motors are uncoupled from one another. The incremental path indicator is associated with the roll (at the outlet of the drawing unit) driven by the second electric motor, whereby a sensitive monitoring of the rotation of such roll may be achieved. While the freewheel backstop blocks the reverse rotation of the first electric motor and the associated roll or rolls (at the input of the drawing unit), an electronic reverse lock may be achieved at the second electric motor (at the outlet of the drawing unit) in response to signals from the incremental path indicator. The incremental path indicator detects even very small changes in the motor rpm and thus in its angular displacement and also detects the direction of rotation of the roll, so that based on the signals representing such magnitudes, a compensation-control may be effected. This provides the possibility to block a reverse run at the outlet of the drawing unit. In case a slight reverse run occurs, the position of the roll is accurately detected at standstill (that is, in addition to the direction of rotation the extent of the reverse rotation is sensed), so that the drawing unit may be restarted from such a position. By means of these measures the drawing of the sliver may be improved.

The invention has the following additional advantageous features:

The first electric motor is a regulated motor and the second electric motor is a principal motor. The rpm of the first electric motor is utilized for compensating for irregularities of the sliver sheaf to be processed.

In a drawing unit having a preliminary drawing zone and a principal drawing zone, the freewheel backstop is associated with the drive for the preliminary drawing zone and the incremental path indicator is associated with the drive for the principal drawing zone.

The freewheel backstop has a sprag-type structure.

The freewheel backstop is arranged coaxially with or parallel to the roll.

A common transmission shaft associated with the freewheel backstop is arranged between the first electric motor and at least two driven rolls.

The freewheel backstop is associated with the input roll.

The freewheel backstop is associated with the middle roll in a drawing frame in which the middle and input rolls are mechanically coupled to one another.

At the outlet of the drawing frame a high-resolution incremental path indicator is arranged.

The incremental path indicator at the outlet of the drawing unit indicates the direction of rotation of the roll.

The roll or rolls driven by the first electric motor have an incremental rotary path indicator. In this manner, a precise start-up of the drawing unit with respect to the extent of draft is obtained.

The incremental rotary path indicator at the input of the drawing unit is of high resolution.

The incremental rotary path indicator of high resolution at the outlet and/or at the inlet of the drawing frame makes possible to maintain the extent of draft close to standstill or at low rpm's.

The incremental rotary path indicator detects the rpm and/or the rotary angle and/or the direction of rotation of the roll.

The incremental rotary path indicator is encapsulated.

The incremental rotary path indicator or indicators are connected to the electronic control and regulating device, such as a microcomputer.

The electronic control and regulating device determines the rpm and/or the angle of rotation and/or the direction of rotation of the roll from the signals transmitted by the incremental rotary path indicator or indicators.

The principal motor may be rpm-controlled.

BRIEF DESCRIPTION OF THE DRAWINGS

FIG. 1b is a schematic side elevational view of the drawing rolls of the drawing unit shown in FIG. 1a.

DESCRIPTION OF THE PREFERRED EMBODIMENTS

Figure 1A:
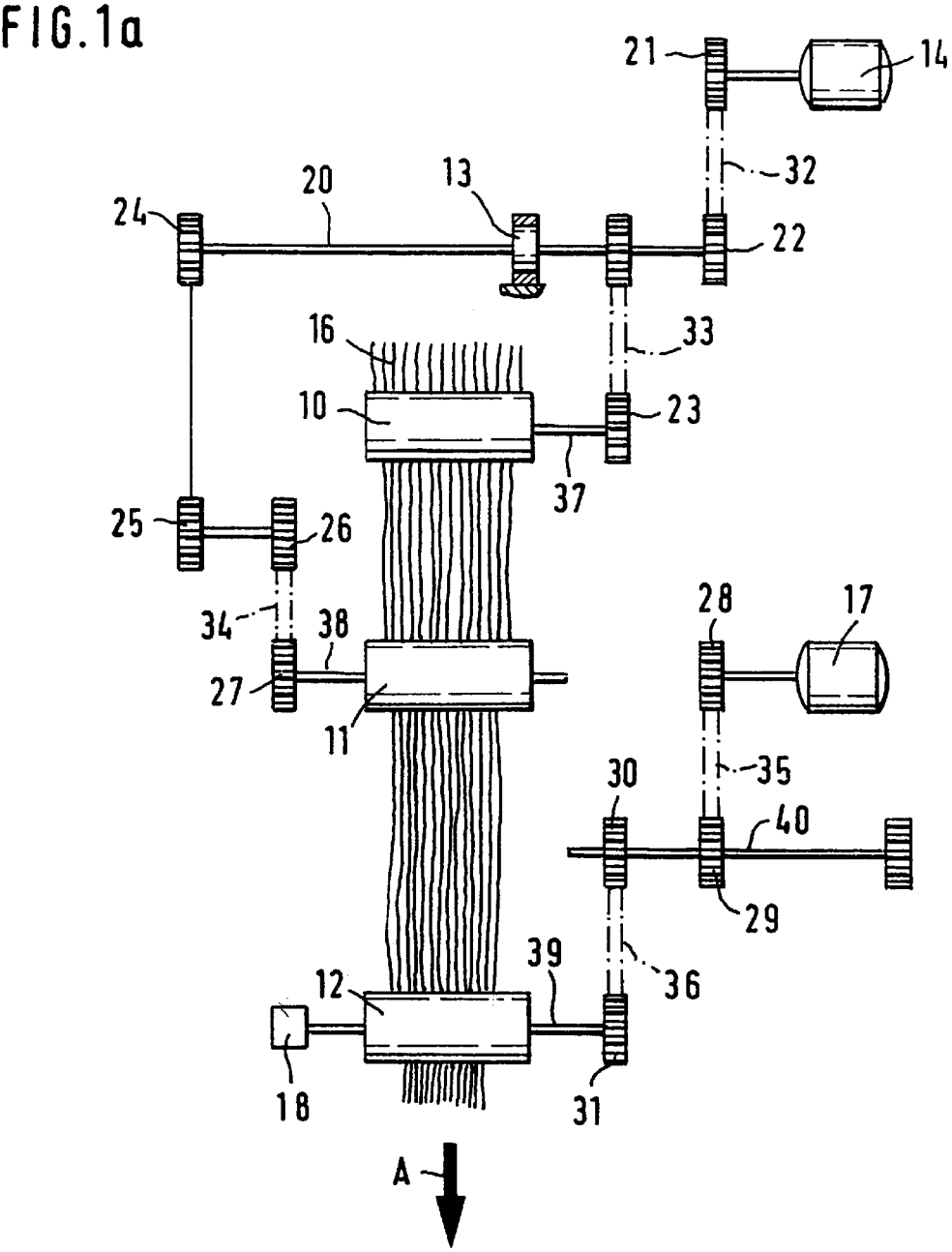
FIG. 1a is a schematic top plan view of a sliver drawing unit in which a freewheel backstop is associated with a common transmission shaft.
Figure 1B:
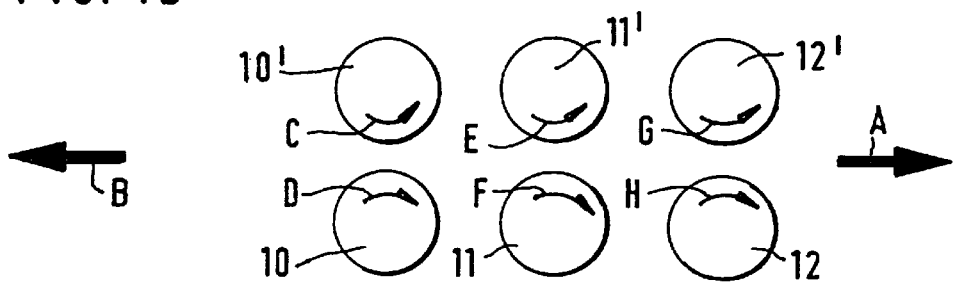

The regulated drawing unit illustrated in FIG. 1a and 1b has an input roll pair 10, 10', a middle roll pair 11, 11' and an output roll pair 12, 12'. The lower input roll 10, the lower middle roll 11 and the lower output roll 12 are driven rolls and are pressed to respective idling upper rolls 10', 11', 12' by adjustable pressing forces. The lower input roll 10 and the lower middle roll 11 are coupled to one another by a transmission gear whose transmission ratio corresponds to a predetermined initial draft. The lower middle roll 11 and thus also the lower input roll 10 are driven by an electric drive motor 14 coupled to a freewheel backstop 13 which blocks a rotation of the lower input roll 10 and the lower middle roll 11 in a direction (arrow B) opposite the running direction (arrow A) of a sliver assembly 16 (sliver sheaf) composed of a plurality of slivers.

The lower output roll 12 is driven by its own electric drive motor 17 and is connected with an incremental rotary path indicator 18.

The rpm's of the electric motors 14 and 17 are regulated by means of an electronic regulating apparatus such that in the principal drafting zone between the middle roll pair 11, 11' and the output roll pair 12, 12' a draft up to the desired fineness occurs while at the same time mass oscillations of the incoming sliver sheaf 16 are equalized to the extent possible.

Between the electric motor 14 and the two driven rolls 10 and 11 a common transmission shaft 20 is provided which is associated with the freewheel backstop 13. The shaft 20 is directly driven by the electric motor 14 and its torque is divided such that the transmission shaft 20 indirectly drives the two rolls 10 and 11 by means of gearing whose transmission ratio to the rolls 10 and 11 is adjustable. The freewheel backstop 13 is arranged axially parallel to the rolls 10, 11. The lower output roll 12 is coupled with an incremental rotary path indicator 18.

Reference numerals 21–31 designate toothed gears or sprockets; reference numerals 32–36 designate toothed belts and reference numerals 37–40 designate shafts. The material flow in the working direction is designated at A. The lower rolls 10, 11 and 12 have a respective rpm of, for example, 1400, 2000 and 7200 and a respective diameter of, for example, 35 mm, 35 mm and 40 mm. At the output of the rolls 12, 12' the running speed of the sliver is approximately 900 m/min at an rpm of 7200 of the lower roll 12.

Figure 2A:
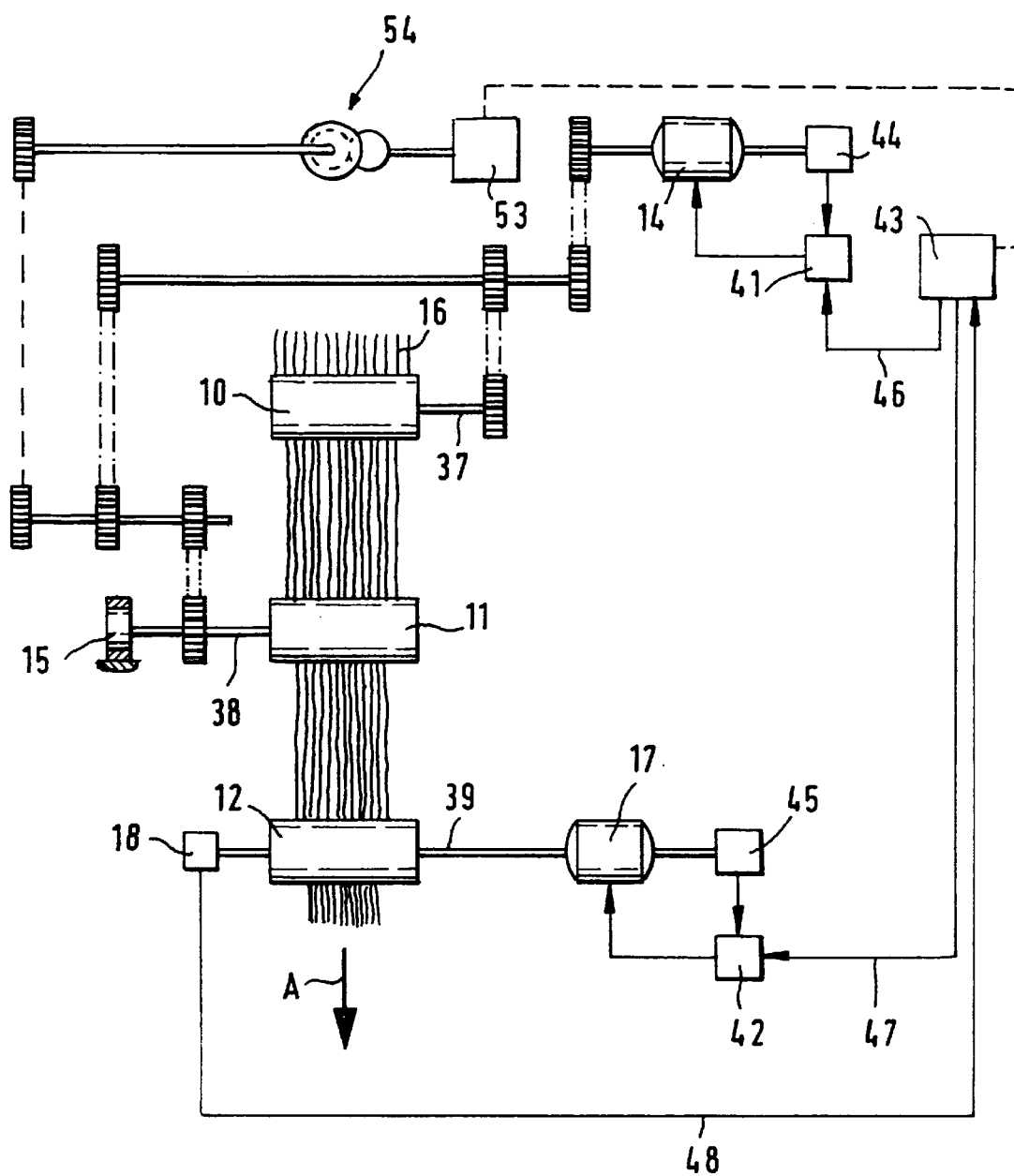
FIG. 2a is a schematic top plan view of a drawing unit and a block diagram for preventing drifting in the operational rotary direction upon stoppage, including a freewheel backstop and an incremental rotary path indicator.

In FIG. 2a with each electromotor 14, 17 an electronic motor regulating device 41 and, respectively, 42 (rpm regulation) is associated which are connected to the common electronic machine control device 43. With the electric motors 14 and 17 respective tachogenerators 44 and 45 are associated which are connected to the respective electronic motor regulating devices 41 and 42. The electronic motor regulating devices 41 and 42 are electrically equalized in such a manner that, upon stoppage, the desired values 46 and 47 for the rpm and the direction of rotation applied by the electronic machine control device 43 to the motor regulating device 41 and 42 generate for the motors 14 and 17 a torque which is directed opposite to the normal operational direction C-H (FIG. 1b). A freewheel backstop 15 is coaxially connected with the lower middle roll 11. The incremental rotary path indicator 18 which is associated with the lower output roll 12 is electrically connected by a conductor 48 with the electronic machine control device 43.

Figure 2B:
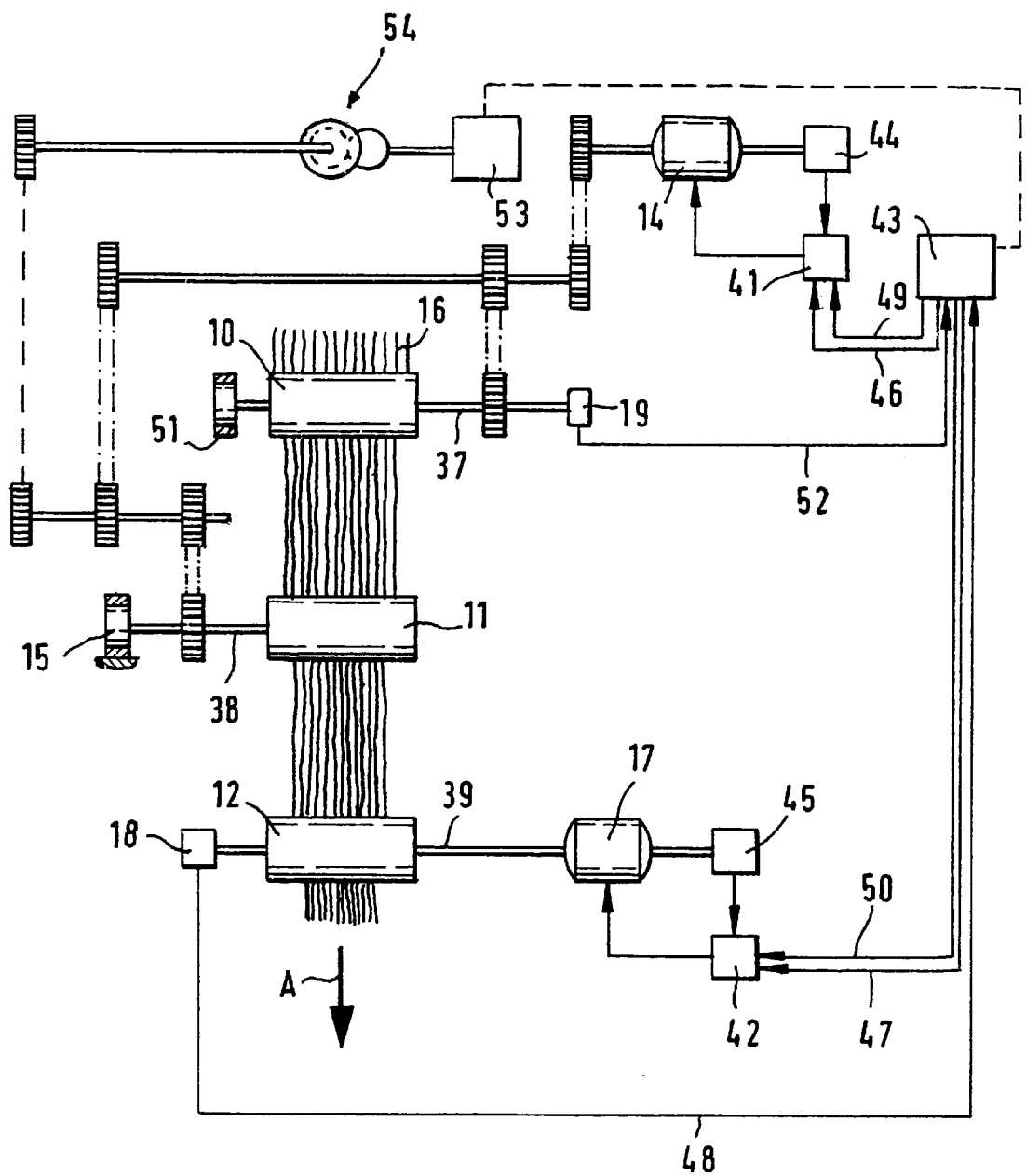
FIG. 2b illustrates a structure similar to FIG. 2a, including two freewheel backstops and two rotary path indicators.

As further shown in FIG. 2b, additional signals 49 and 50 representing the direction of rotation of the electric motors 14 and 17 are applied by the electronic motor control device 43 to the respective motor regulating devices 42 and 41. In such an arrangement the desired values thus determine only the rpm.

A freewheel backstop 51 is coaxially connected with the lower input roll 10. Further, an incremental rotary path indicator 19 is coupled with the lower input roll 10 and is connected by a conductor 52 with the electronic machine control 43.

The electronic machine control 43 shown in FIGS. 2a and 2b may be, for example, a joint electronic control and regulating device, such as a microcomputer which also encompasses the non-illustrated electronic regulating device for equalizing irregularities.

A measuring value transducer 53 converts the radial excursions of a groove-and-tongue type roll pair 54 into electronic signals.

The freewheel backstops 13, 15 or 51 provide for a rotary motion of the rolls only in a single direction, that is, in the feed direction C-H (as shown in FIG. 1b) during operation. After standstill of the drawing frame the freewheel backstops prevent a reverse rotary motion of the rolls.

Figure 3A:
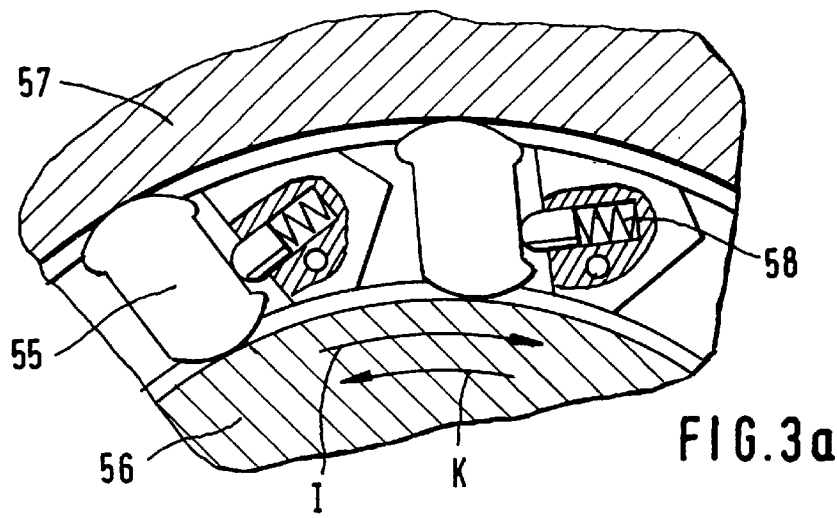
FIG. 3a is a fragmentary enlarged sectional view of a sprag-type freewheel backstop.
Figure 3B:
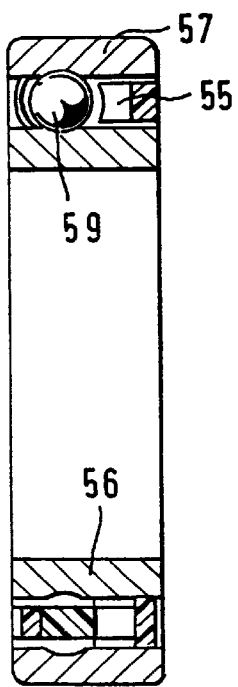
FIG. 3b is an axial sectional view of the entire freewheel backstop.
Figure 3C:
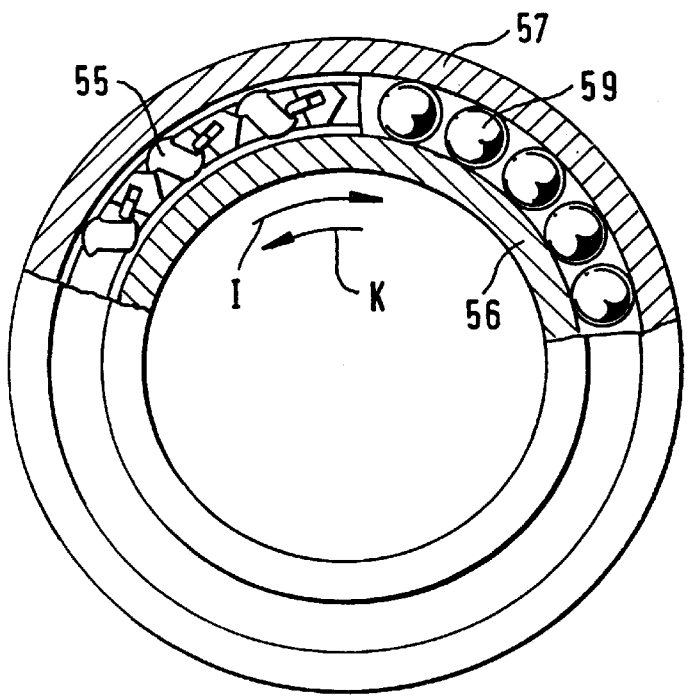
FIG. 3c is an end view, partially in section, of an entire freewheel backstop.

Turning to FIGS. 3a, 3b and 3c, in the ball bearing/freewheel backstop assembly the bearing balls 59 are accommodated in a robust cage which also guides a plurality of individually spring-biased sprags 55 which have, in the freewheeling direction I, based on their geometrical shape, a "lifting tendency" which at high rpm's results in a complete freedom of contact from the inner race 56 and the outer race 57. A sufficient relative cage rpm derived from a sufficient radial load of the bearing is of importance. The freewheel backstops 13, 15 or 51 operate steplessly and in a force-locking (friction-locking) manner. The sprags 55 lift off the races 56, 57 in the freewheeling direction I by virtue of centrifugal forces. In the reverse direction K a clamping and thus a locking effect is obtained by virtue of the pressing of the springs 58 against the respective sprags 55 which engage the races 56, 57. The inner race 56 is press-fitted on a shaft passing through the freewheel backstop. The shaft may be, for example, a drive shaft of a driven roll 10, 11, 12 or a transmission shaft between a drive motor and the associated driven roll. When the drawing frame is at a standstill, the shaft passing through the freewheel backstop is prevented from rotating in the reverse sense (opposite to the normal, forward rotation) due to the fact that the sprags 55 lock the inner race 56 (to which the throughgoing shaft is affixed) to the fixedly held (non-rotatable) outer race 57.

It will be understood that instead of sprag-type freewheel backstops, other types of one-way clutch constructions, for example, clamping roller-type freewheel backstops may be used. Further, the invention also comprises unsupported freewheel backstops in which the shaft is supported by a separate bearing, such as roller bearings and also encompasses supported (combined) freewheel backstops in which the freewheel backstop and, for example, the roller bearing (ball bearing, cylinder roll bearing, needle bearing, barrel bearing, and the like) form an integral assembly as illustrated in FIGS. 3b and 3c.

The reverse run lock obtained by the freewheel backstops 13, 15 or 51 prevents a reverse rotation of the rolls during standstill. The reverse turning motion practically always tends to occur and is caused particularly by the tension of the sliver and the drive belts. In this manner an undesired reverse rotation of the rolls is prevented in the input zone of the drawing unit. The incremental rotary path indicator 18 ensures that practically no reverse rotation of the rolls 12, 12' can take place.

Figure 4:
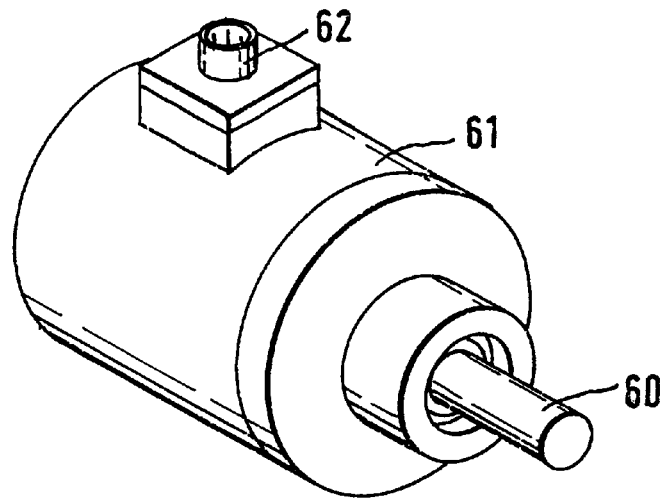
FIG. 4 is a perspective view of an incremental rotary path indicator.

The incremental rotary path indicator 18 or 19 which is shown in FIGS. 2a and 2b and which is structurally illustrated in FIG. 4, generates a pulse series whose frequency is proportional to the rpm of the roll to be monitored. The incremental rotary path indicator 18 is designed to distinguish between rotary directions and to detect angular positions and rpm's. The rotary path indicator 19 is designed similarly to the component 18, but without the capability of distinguishing between rotary directions, that is, it is utilized only for detecting rpm's, speeds and the like. Expediently, a magnetic incremental rotary path indicator is used in which a measuring bar 60 and an encapsulated measuring head 61 are provided. The electric output terminal of the rotary path indicator 19 is designated at 62.

Figure 5B:
FIG. 5b is a diagram of a signal emitted by the rotary path indicator, without distinguishing directions of rotation.
Figure 5A:
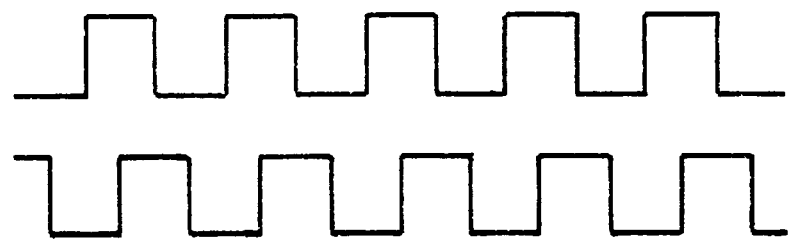
FIG. 5a is a diagram of a signal emitted by the rotary path indicator for distinguishing rotary directions.

Turning to FIG. 5a, two sinusoidal signals which are shifted 90°, are transformed into rectangular pulses of a 1:1 cycling ratio and are outputted in two tracks. This arrangement makes possible to distinguish between rotary directions. According to FIG. 5b, the sinusoidal voltage is converted into a single series of rectangular pulses with a 1:1 ratio and thus only a single track is outputted. With this arrangement a rotary directional distinction is not feasible.

Departing from the embodiments illustrated in FIGS. 1a, 2a and 2b, the freewheeling backstop may be arranged between the electric motor 14 and the lower middle roll 11. It may be, for example, arranged in a stepdown gear or it may be integrated into the electric motor 14.

It will be understood that the above description of the present invention is susceptible to various modifications, changes and adaptations, and the same are intended to be comprehended within the meaning and range of equivalents of the appended claims.

What is claimed is:

1. A drawing unit for drawing sliver passing through the drawing frame in a direction of advance, comprising
    (a) first and second drawing roll pairs being spaced from one another in said direction of advance and each including two cooperating drawing rolls; one drawing roll in each said drawing roll pair being a driven roll;
    (b) first and second drive motors;
    (c) first torque-transmitting means connected to said first drive motor and to the driven roll of said first drawing roll pair for driving said first drawing roll pair in a forward sense for feeding the sliver in said direction of advance;
    (d) second torque-transmitting means connected to said second drive motor and to the driven roll of said second drawing roll pair for driving said second drawing roll pair in a forward sense for feeding the sliver in said direction of advance;
    (e) an electronic machine control device connected to said first and second drive motors;
    (f) a freewheel backstop operatively connected to said driven roll of said first roll pair for preventing rotation thereof in a reverse sense opposite to said forward sense; and
    (g) an incremental rotary path indicator coupled to said driven roll of said second roll pair for generating signals representing rotary data of said driven roll of said second roll pair; said incremental rotary path indicator being connected to said electronic machine control device for applying said signals to said electronic machine control device for blocking a reverse rotation of said second drive motor and said second roll pair as a function of said signals.

2. The drawing unit as defined in claim 1, wherein said freewheel backstop is a sprag-type freewheel backstop.

3. The drawing unit as defined in claim 1, wherein said freewheel backstop is arranged coaxially with said driven roll of said second roll pair.

4. The drawing unit as defined in claim 1, wherein said freewheel backstop is arranged axially parallel to said driven roll of said second roll pair.

5. The drawing unit as defined in claim 1, further comprising a third drawing roll pair situated between said first and second drawing roll pairs and including two cooperating drawing rolls; one drawing roll of said third drawing roll pair being a driven roll; further wherein said first torque-transmitting means includes a drive shaft torque-transmittingly connecting said first drive motor to said driven rolls of said first and third drawing roll pairs; said freewheel backstop being mounted on said drive shaft.

6. The drawing unit as defined in claim 1, further comprising a third drawing roll pair situated between said first and second drawing roll pairs and including two cooperating drawing rolls; one drawing roll of said third drawing roll pair being a driven roll; further wherein said first torque-transmitting means torque-transmittingly connects said first drive motor to said driven rolls of said first and third drawing roll pairs; said driven roll of said first drawing roll pair having a roll shaft; said freewheel backstop being mounted on said roll shaft.

7. The drawing unit as defined in claim 1, further comprising a third drawing roll pair situated between said first and second drawing roll pairs and including two cooperating drawing rolls; one drawing roll of said third drawing roll pair being a driven roll; further wherein said first torque transmitting means torque-transmittingly connects said first drive motor to said driven rolls of said first and third drawing roll pairs; said driven roll of said third drawing roll pair having a roll shaft; said freewheel backstop being mounted on said roll shaft.

8. The drawing unit as defined in claim 1, wherein said incremental rotary path indicator operates with high resolution.

9. The drawing unit as defined in claim 1, wherein said rotary data is one of the direction of rotation, rpm and rotary angle of said driven roll of said second roll pair.

10. The drawing unit as defined in claim 1, wherein said incremental rotary path indicator is encapsulated.

11. The drawing unit as defined in claim 1, wherein said incremental rotary path indicator is a magnetic incremental rotary path indicator.

12. The drawing unit as defined in claim 1, wherein said second drive motor is rpm-regulatable.

13. The drawing unit as defined in claim 1, further comprising a sliver regulating device connected to said electronic machine control device and said first drive motor for varying the rpm of said first drive motor.

14. The drawing unit as defined in claim 1, further comprising first and second electronic motor regulating devices connected to said electronic machine control device and to said first and second drive motors, respectively.

15. The drawing unit as defined in claim 1, wherein said incremental rotary path indicator is a first incremental rotary path indicator; further comprising a second incremental rotary path indicator operatively coupled to said driven roll of said first roll pair for generating signals representing rotary data of said driven roll of said first roll pair.

16. The drawing unit as defined in claim 15, wherein said second incremental rotary path indicator is connected to said electronic machine control device for applying thereto said signals generated by said second incremental rotary path indicator.

17. The drawing unit as defined in claim 15, wherein said rotary data of said driven roll of said first roll pair is one of the direction of rotation, rpm and rotary angle of said driven roll of said first roll pair.

18. The drawing unit as defined in claim 15, wherein said second incremental rotary path indicator operates with high resolution.

* * * * *